(12) United States Patent
Wolfsgruber

(10) Patent No.: US 9,788,644 B2
(45) Date of Patent: Oct. 17, 2017

(54) METHOD FOR MANUFACTURING A ONE-PIECE, MULTI-COMPONENT INJECTION MOLDED BRUSH

(71) Applicant: GEKA GmbH, Bechhofen (DE)

(72) Inventor: Dieter Wolfsgruber, Burgoberbach (DE)

(73) Assignee: GEKA GmbH, Bechhofen (DE)

( * ) Notice: Subject to any disclaimer, the term of this patent is extended or adjusted under 35 U.S.C. 154(b) by 858 days.

(21) Appl. No.: 13/922,392

(22) Filed: Jun. 20, 2013

(65) Prior Publication Data

US 2014/0001819 A1 Jan. 2, 2014

(30) Foreign Application Priority Data

Jun. 20, 2012 (DE) .................... 10 2012 012 114

(51) Int. Cl.
*A46D 3/00* (2006.01)
*B29C 45/16* (2006.01)
*B29C 45/26* (2006.01)
*A46B 9/02* (2006.01)
*B29L 31/42* (2006.01)

(52) U.S. Cl.
CPC ............. *A46D 3/00* (2013.01); *A46B 9/021* (2013.01); *B29C 45/1635* (2013.01); *B29C 45/2626* (2013.01); *A46B 2200/1053* (2013.01); *B29C 45/1676* (2013.01); *B29L 2031/42* (2013.01)

(58) Field of Classification Search
CPC .. A46D 3/00; A46D 3/005; A46B 9/02; A46B 1/00; A46B 3/005; A46B 9/021; A46B 2200/1053; A46B 2200/106; B29C 45/16; B29C 45/26; B29L 31/42

USPC .......... 264/328.1, 328.8, 243, 246; 425/110, 425/190, 542, 127; 15/22.1, 207.2, 187, 15/188; 300/2, 21; 132/218
See application file for complete search history.

(56) References Cited

U.S. PATENT DOCUMENTS 4,403,624 A * 9/1983 Montgomery ....... A45D 40/267
132/218
4,422,986 A * 12/1983 Cole .................. A46B 3/005
15/187

(Continued)

FOREIGN PATENT DOCUMENTS

EP 2389833 A2 11/2011
WO 0203831 A1 1/2002
(Continued)

*Primary Examiner* — Nahida Sultana

(57) ABSTRACT

The invention relates to a method for producing a brush, particularly in the form of a mascara applicator, with bristles injection molded out of different injection molding compounds, using an injection mold that has a main cavity, which forms the bristle support, and secondary cavities branching off from this, with each secondary cavity forming a single bristle and with at least one first injection molding compound being injected into the main cavity, followed by a second injection molding compound in successive steps; at least one slider is inserted into the main cavity and closes part of the secondary cavities so that the first injection molding compound only travels into another part of the secondary cavities after which the slider is withdrawn and the second injection molding compound is injected so that it travels into the secondary cavities previously closed by the slider.

6 Claims, 9 Drawing Sheets

(56) References Cited

U.S. PATENT DOCUMENTS

| | | | | |
|---|---|---|---|---|
| 4,561,456 A * | 12/1985 | Gueret | ................ | A46B 1/00 132/159 |
| 5,683,644 A * | 11/1997 | Peterson | ............... | B29C 45/435 249/68 |
| 6,042,770 A * | 3/2000 | Sudo | ................ | B29C 45/0081 264/248 |
| 6,616,366 B1 * | 9/2003 | Weihrauch | ........... | A45D 34/043 132/216 |
| 8,627,831 B2 * | 1/2014 | Limongi | ................ | A46B 9/021 132/218 |
| 8,920,058 B2 * | 12/2014 | Simard | ............... | A46B 5/0054 132/218 |
| 8,944,714 B2 * | 2/2015 | Gueret | ................ | A46B 1/00 401/126 |
| 2003/0163884 A1 * | 9/2003 | Weihrauch | ............... | A46B 3/22 15/207.2 |
| 2008/0023020 A1 * | 1/2008 | Gueret | ................ | A45D 40/265 132/218 |
| 2010/0037911 A1 | 2/2010 | Kim | | |
| 2010/0175708 A1 * | 7/2010 | Kim | ................ | A45D 40/262 132/218 |
| 2011/0297175 A1 | 12/2011 | Pires et al. | | |
| 2013/0291320 A1 * | 11/2013 | Kirchhofer | ............... | A46B 1/00 15/22.1 |
| 2014/0147547 A1 * | 5/2014 | Ueno | ................ | B29C 45/4421 425/556 |
| 2014/0291891 A1 * | 10/2014 | Charnay | ................ | A46B 9/021 264/296 |
| 2015/0135456 A1 * | 5/2015 | Kirchhofer | ............... | A46B 1/00 15/160 |

FOREIGN PATENT DOCUMENTS

| | | | | |
|---|---|---|---|---|
| WO | WO2012093085 A2 * | 7/2012 | ............... | A46B 1/00 |
| WO | WO2013/060730 A1 * | 5/2013 | ............. | A46B 9/021 |

* cited by examiner

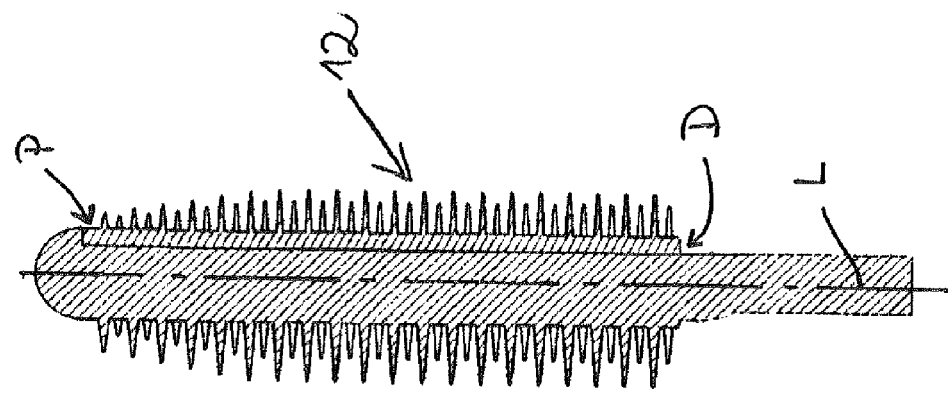
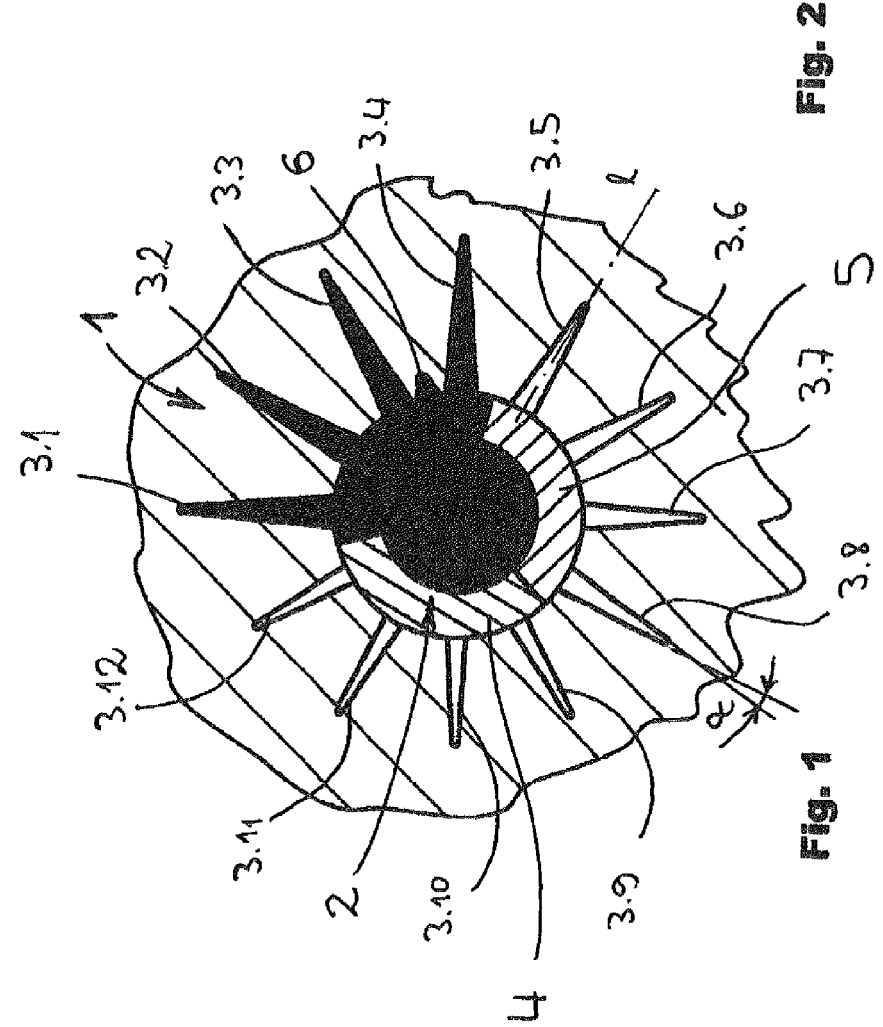
Fig. 1
Fig. 2

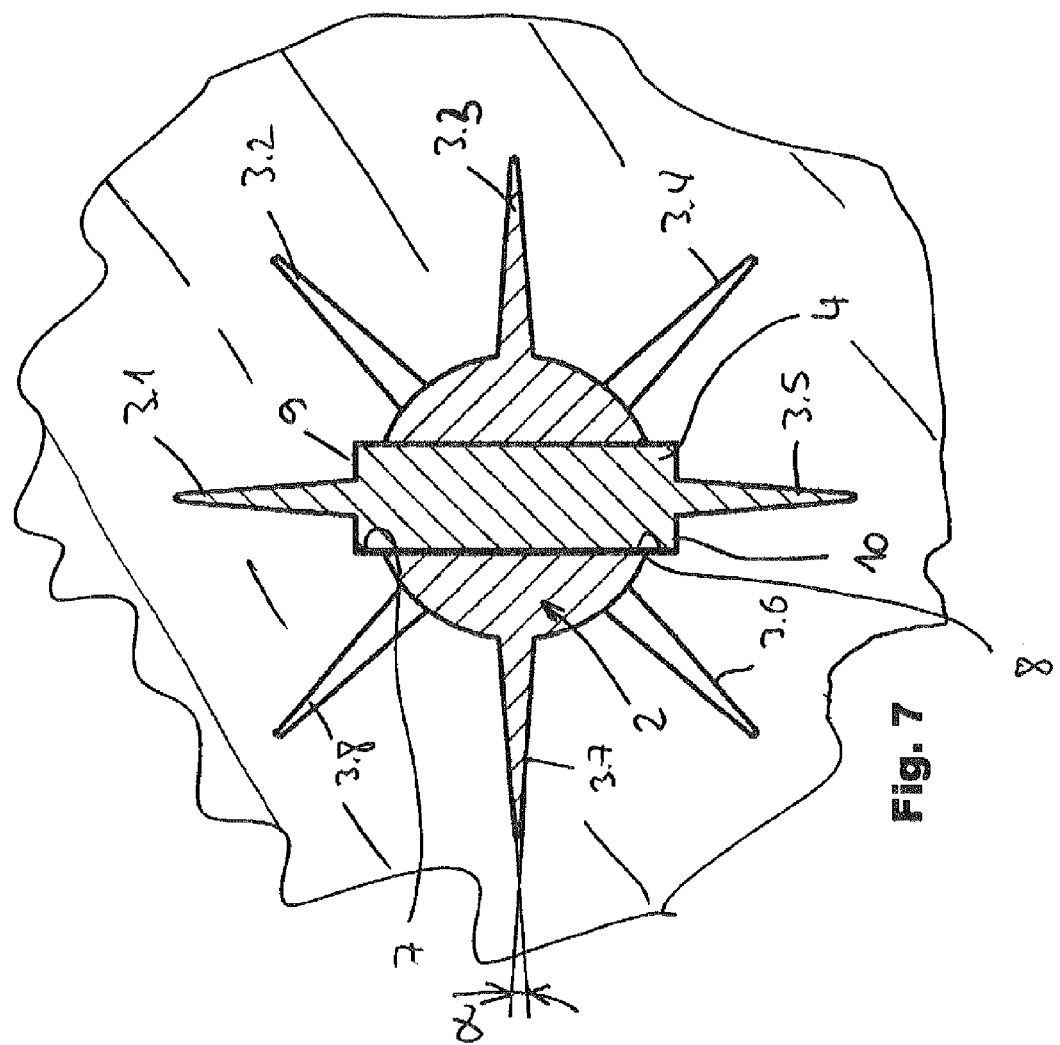

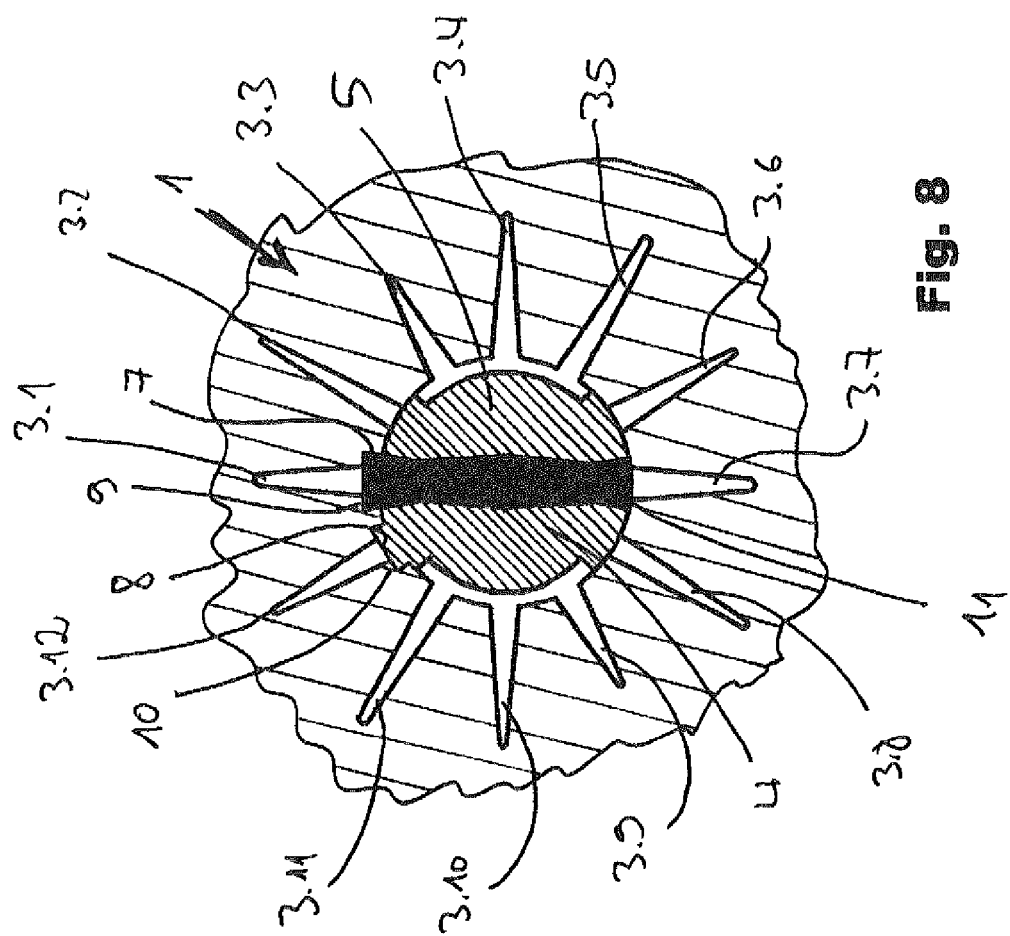

METHOD FOR MANUFACTURING A ONE-PIECE, MULTI-COMPONENT INJECTION MOLDED BRUSH

FIELD OF THE INVENTION

The invention relates to a method used to manufacture a brush, in particular in the form of a mascara applicator.

BACKGROUND OF THE INVENTION

Classically, mascara applicators in the form of brushes were produced using the long-exclusive method of inserting natural or synthetic fibers between two wires that were initially straight. Then, these wires were twisted and held the fibers inserted between them tightly in a particular configuration. These brushes are commonly referred to as wire core brushes.

Wire core brushes have many advantages. But they all have one fundamental disadvantage, namely that the distance of the individual bristles of the set of bristles from one another can only be varied within very limited ranges. It is practically impossible to produce an applicator that has a truly uniform set of bristles around and along the longitudinal direction. Instead, in wire core brushes, the set of bristles is always densest along a helical curve, which follows the twisting of the wires, and is less dense in other regions.

With the ability to produce ever more delicate injection molds, the last approximately ten years have seen the production of increasing numbers of injection molded brushes, which are then used as mascara applicators. These are one-piece brushes in which the bristle support and the bristles protruding from it are produced from one and the same material, generally in one piece by means of injection molding. In order to produce brushes of this kind, injection molds are used that have a main cavity that forms the bristle support. Secondary cavities branch out from this, generally at right angles. Each of the secondary cavities comprises a cavity that forms one bristle.

In this way, it is possible to produce brushes whose set of bristles can be varied in broad ranges with regard to their diameter, length, bristle density, etc. and can therefore be adapted very well to the individual requirements for the application.

In practice, there is continuous demand for providing the injection molded applicators with the same feel as the wire core applicators, even to the extent that the injection molded applicators are provided with bristles of different hardnesses.

To a certain extent, the hardness of the bristles can also be controlled—even when using only a single material—by appropriately setting the bristle diameter; bristles that must be softer are provided with a smaller diameter. There are nevertheless limits to this since the bristles must have a minimum diameter in order not to tear off when being removed from the mold.

Because of this, embodiments have already been proposed in which the bristle-supporting parts, which are composed of a different material, are welded or glued onto an injection molded applicator. This kind of applicator is costly and in addition, a reliable bond is not always assured. Between the rows that are assembled by gluing, it is also not possible to prevent gaps from being left in which the compound to be applied can become permanently lodged, which is disadvantageous because under some circumstances it can become contaminated with germs.

Applicators have also been proposed in which a bristle support that is equipped with bristles composed of a first material has another bristle support clipped to it, which is equipped with bristles composed of a second material. This embodiment is also unsatisfactory because the clipping requires an additional assembly step and once again, cosmetic compound can also collect in the interstice between the parts that are clipped to each other and then constitutes a breeding ground for germs.

By contrast, the object of the present invention is to propose a way that permits the efficient production of brushes, in particular delicate brushes in the form of mascara applicators, which are equipped with bristles composed of different plastics and can be produced as a whole by means of injection molding.

SUMMARY OF THE INVENTION

A method is proposed for producing a brush and in particular a mascara applicator, with bristles that are injection molded out of different injection molding compounds. An applicator of this kind that is equipped with bristles is also referred to as a brush. The bristles preferably have a particular flexibility, as indicated at the end of the description. The method is carried out using an injection mold that has a main cavity that forms the bristle support. Secondary cavities branch out from this, with each secondary cavity forming a single bristle. In successive steps, at least one first injection molding compound is injected into the main cavity, followed by a second injection molding compound. In the main cavity, at least one slider is provided, which initially closes one part of the bristle-forming secondary cavities so that the first injection molding compound only travels into another part of the secondary cavities, but not into the secondary cavities closed by the slider. In a subsequent method step, after the first injection molding compound transitions from the liquid state into the solid state, the slider is withdrawn and the second injection molding compound is injected so that it travels into the secondary cavities that have been closed by the slider up till now. If the second injection molding compound differs from the material of the first injection molding compound, then this yields a mascara brush that is equipped with injection molded bristles and is essentially composed of one piece because the two injection molding compounds have bonded with each other in a way similar to welding and in which the bristles are composed of the different materials and therefore have different application properties. Merely for the sake of completeness (but not preferably), the invention also covers the embodiment in which the two injection molding compounds differ from each other only in terms of color so that the method according to the invention is simply used to produce one-piece brushes that have a particularly attractive visual appearance.

Preferably, the second injection molding compound that travels into the mold in the additional method step is conveyed to the not yet filled secondary cavities through the cavity that the previously withdrawn slider has left behind in the main cavity. This provides a very wide conduit that preferably permits a flow to travel through it at least essentially without loss of pressure, via which conduit the second injection molding compound can be conveyed to the places at which the main cavity feeds into the secondary cavities. This ensures that the secondary cavities that are provided for the second injection molding compound are cleanly filled by it so that they accurately form the bristles that are to be composed of the second injection molding material.

According to a preferred embodiment, the slider and the injection mold into which it is slid are embodied so that the slider can be withdrawn from the main cavity in the direction of the longitudinal axis of the mascara applicator. Sliders of this kind, which are to be withdrawn in the direction of the longitudinal axis, are used when the respective applicator has a core with a relatively large core diameter or only a single slider is used.

In other instances in which the technology according to the invention is used, it is particularly advantageous to provide one or more sliders that are to be inserted and later withdrawn in a radial direction.

A radial slider of this kind and the region of the main cavity properly associated with it are ideally embodied so that the slider is inserted ("plugged in") from one side in a radial direction, crosses through the main cavity in a radial direction, and then on the opposite side (in terms of the insertion direction), covers a region on the inner circumference of the main cavity from which bristle-forming secondary cavities branch.

Ideally, the circumference of the main cavity has a groove let into it, which extends with its longitudinal direction parallel to the longitudinal axis of the main cavity.

When a radial slider is used, this groove is situated on the side opposite from the opening into which the radial slider is inserted into the main cavity.

The secondary cavities to be sealed by the radial slider open out into the bottom of the groove. The completely inserted radial slider comes to rest in the groove so that the groove side walls prevent or at least reduce a movement of the radial slider in the direction perpendicular to its insertion direction that would otherwise be a threat due to the influence of the injection pressure.

Preferably, the slider has at least one ridge extending in the direction parallel to the longitudinal axis of the main cavity protruding up from its circumferential surface and when inserted into the injection mold, seals the mouths of a row of secondary cavities that open into the main cavity and in the finished applicator, form a row of protruding bristles situated one after another in the longitudinal direction. In this way, it is very easily possible to embody rows of bristles with different properties, for example to equip the whole set of bristles with one row of particularly hard bristles that constitute a comb.

In a preferred embodiment, the slider has a ridge that engages in a groove provided in the circumference of the main cavity, extending in the direction essentially parallel to the longitudinal axis of the applicator. Such an engagement of the ridge that seals the secondary cavities in a groove facilitates the sealing of the secondary cavities.

As explained above in the example of the radial slider, such a groove can be used to center the slider inside the main cavity and/or to predetermine a defined position of the slider inside the main cavity. This makes it easily possible to ensure that the slider is always correctly positioned inside the main cavity. This also applies to longitudinal sliders, i.e. sliders that are inserted or withdrawn in the direction of the longitudinal axis of the main cavity.

In this case, the mouths of a number of secondary cavities opening out into the main cavity feed into the groove bottom. This also improves the sealing action.

Regardless of whether the slider is embodied as a radial slider or a longitudinal slider, the ridge preferably rests in the grooves in a sealed fashion, i.e. it seals either against the groove bottom and/or against the two groove side walls. Optimally, the ridge also rests in a sealed fashion next to the groove on at least one side. This produces a sealing gap and/or a sealing surface that does not extend continuously, but rather in at least one location and preferably several times, abruptly changes its direction, preferably by an angle of greater than 45°, ideally by an angle of greater than 60°. This produces a kind of the labyrinth that ensures a better sealing action.

Preferably, the slider that is inserted into the main cavity is composed of multiple parts. In this way, it is possible not only to produce bristles that vary between two different materials, but also if need be, to produce bristles out of three or more different materials.

Other embodiment possibilities, advantages, and functions of the invention ensue from the following description of the invention in conjunction with the exemplary embodiments.

BRIEF DESCRIPTION OF THE DRAWINGS

FIG. 1 shows a section through an injection mold constituting a first exemplary embodiment, perpendicular to the longitudinal axis of the main cavity and slider.

FIG. 2 shows a mascara brush produced using the injection mold according to FIG. 1.

FIG. 7 shows a section through an injection mold constituting a fourth exemplary embodiment, perpendicular to the longitudinal axis of the main cavity and slider.

FIG. 8 shows a section through an injection mold constituting a fifth exemplary embodiment, perpendicular to the longitudinal axis of the main cavity and the slider.

DETAILED DESCRIPTION OF THE PREFERRED EMBODIMENTS

Figure 4:
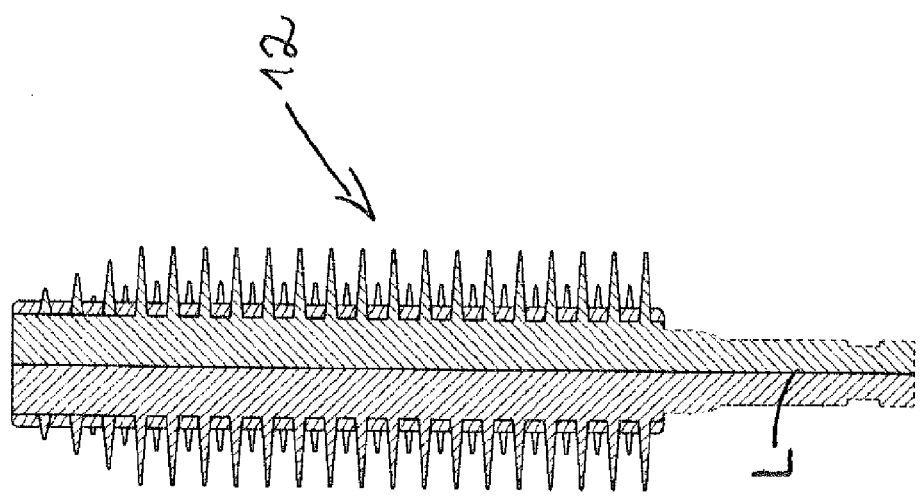
FIG. 4 shows a mascara brush produced using the injection mold according to FIG. 3.

FIG. 1 shows a detail of the injection mold, depicted with large crosshatching, whose design is only of particular interest in the region of the cavity that forms the subsequent applicator.

The injection mold is divided into segments in the form of slices of cake that can be retracted from one another in the radial direction in order to remove the finished injection molded applicator from the mold—which FIG. 1 and the other figures do not show in detail, but they are based on it.

The injection mold has a main cavity 1 with a longitudinal axis L extending perpendicular to the plane of the drawing, see FIG. 2. Secondary cavities 3.1, 3.2, 3.3, etc., branch off perpendicularly from this main cavity. Each of the secondary cavities is preferably embodied as slightly conical, ideally with a cone angle of α of 0.2° to 5°. Each of the secondary cavities forms an individual bristle. The cross-section of each individual secondary cavity perpendicular to its longitudinal axis 1 is round, oval, or elliptical.

FIG. 1 shows the injection mold at a stage in which the first injection molding compound has already been injected into the cavity so that it completely fills the cavity—to the extent that it is accessible—which is indicated by the black color.

At this point, there are two sliders 4 and 5 inserted in the main cavity. These two sliders in this case each have the form of a segment of a tube. They are polished. In particular, the outer surface is polished so that it rests in a sealed fashion against the inner circumference encompassing the main cavity of the injection mold.

Each of these two sliders 4 and 5 is situated in front of the mouths of a plurality of secondary cavities, thus preventing the first injection molding compound from traveling into these secondary cavities. In addition, each of these sliders keeps part of the main cavity free of the first injection molding compound. In this way, during the injection of the first injection molding compound, only part of the main cavity and some of the secondary cavities are filled with the first injection molding compound.

The pressure of the first injection molding compound acts on the inner circumference of the sliders 4, 5 in particular and presses the outer circumference of the sliders against the inner circumference of the injection mold that defines the main cavity. This ensures that the sliders also seal the secondary cavities 3.5 to 3.12 in an effectively sealed fashion because the higher the injection pressure of the first injection molding compound, shown in black here, the more tightly they are pressed against the wall of the main cavity.

This "tighter pressing" of the convex outer surface of the respective slider against the concave inner surface of the main cavity also stabilizes the position of the slider, which has been inserted into the main cavity from the end and therefore protrudes into the main cavity in the form of a "cantilever element clamped at one end."

After the first injection molding compound has been fully injected, the process pauses for a moment until the first injection molding compound in the main cavity—and naturally also in the secondary cavities where the cooling occurs more rapidly—has solidified enough that at least one of the two sliders 4 and 5 can be withdrawn. In the exemplary embodiment shown, let us assume that the slider 4 is the first one to be withdrawn. For the time being, the slider 5 continues to remain in its position. The part of the brush shown in black whose injection molding process is already complete remains in its position because it is embodied as part of the subsequent bristle support and is provided with bristles such that the bristles protruding into the secondary cavities hold the part of the bristle support situated in the main cavity in its position. In order to achieve this, it is possible for the part of the bristle support situated in the main cavity after the withdrawal of the relevant slider to be provided with a plurality of bristles that are not oriented parallel to one another, whose longitudinal axes altogether (measured between the two bristles with the most divergent orientations) preferably enclose an angle of at least 45° or better still at least 60°. It is important for the part of the bristle support situated in the main cavity to be equipped with enough bristles to prevent the part of the bristle support remaining in the main cavity from being carried along with the slider by the friction forces produced when the slider is withdrawn and as a result—possibly even by the shearing off of its bristles—being withdrawn at least partway out of the cavity and out of its proper position. Alternatively or additionally, it is possible for the already completely injection molded part of the bristle support that remains in the main cavity when a slider is withdrawn to be provided with one or better still several securing lugs 6 (see FIG. 1), which provide a reliable fixing in the direction of the longitudinal axis of the main cavity. Preferably for at least most of their length in a direction perpendicular to the longitudinal axis of the main cavity, the securing lugs have a diameter that is greater than the diameter of the secondary cavity at its mouth that opens into the main cavity. They are embodied compactly so that they finish solidifying more quickly than an individual bristle, but neither of these features is graphically depicted in FIG. 1.

The two sliders are advantageously embodied so that they taper from their proximal end toward their distal end, for example in that each of the sliders is slightly conical on its inner surface, i.e. constitutes a segment of a tube whose wall thickness decreases from the proximal end to the distal end. The expression the "proximal end" of the slider is understood here to be the end of the slider toward which the slider is subsequently withdrawn. Correspondingly, the "distal end" is the end of the slider oriented opposite from the side toward which the slider is withdrawn. This ensures that as each of the sliders is withdrawn, it does not damage the plastic compound—which has solidified, but is still soft due to its elevated temperature and which remains in the mold until the next injection molding step—but instead exerts as little influence on it as possible.

After the slider 4 has been withdrawn, the main cavity has a cavity extending the same distance in the longitudinal direction as the slider 4 that had previously been inserted into it and the bristle-forming secondary cavities 3.9 to 3.12 feed into this cavity. Then, preferably from one of the end surfaces of the main cavity, a second injection molding compound is injected into the cavity produced by the withdrawal of the slider 4 and this second injection molding compound flows from this cavity into the secondary cavities 3.9 to 3.12 and in them, forms the subsequent bristles.

At this point, the slider 5 is still in its original position and therefore continues to seal the secondary cavities 3.5 to 3.8. After the complete injection of the second injection molding compound, the process pauses until the compound has solidified sufficiently.

Then the second slider 5 is withdrawn.

After the slider 5 has been withdrawn, the main cavity has a cavity extending the same distance in the longitudinal direction as the slider 5 that had previously been inserted into it and the bristle-forming secondary cavities 3.5 to 3.8 feed into this cavity. Then in a third injection molding step, preferably likewise from one of the end surfaces of the main cavity, a third injection molding compound is injected into the cavity produced by the withdrawal of the slider 5 and this third injection molding compound flows from this cavity into the secondary cavities 3.5 to 3.8 and in them, forms the subsequent bristles.

In this way, it is possible to very easily produce a one-piece injection molded brush equipped with a bristle field that has three different sections in the exemplary embodiment described here.

This constitutes a one-piece injection molded part because the different injection molding compounds bond with one another in their large-area contact zones—when parameters are correctly chosen, a welding of the different injection molding compounds in their contact zones occurs because the additional molten injection molding compound injected in a subsequent step liquefies the intrinsically already solidified first injection molding compound at least at the surface, thus producing a weld if care has been taken to ensure that only compatible plastic compounds come into contact with one another (i.e. ones that have reciprocal wettability and mixability).

It is thus possible, for example, for the first injection molding compound to be a comparatively harder plastic. The first bristle field made up of the preferably longer bristles composed of the first injection molding compound (secondary cavities 3.1 to 3.4) is used to comb the eyelashes. The set of bristles also has an additional bristle field made up of the bristles composed of an injection molding compound that produces a plastic material which is softer than all of the other bristle-forming plastic materials (cavities 3.5 to 3.8). The bristle field produced in this way can be very advantageously used for a sensitive application that is largely free of any haptic "peak effect."

Finally, the set of bristles has a third bristle field that is made up of the bristles that were produced, for example, in the cavities 3.9 to 3.12. For this section of bristles, an injection molding compound is used, which is composed of a plastic material that is in fact softer than the plastic material used for the comb-forming region, i.e. the first bristle field (cavities 3.1 to 3.4), but is at the same time harder than the plastic material that was used for the second bristle field (cavities 3.5 to 3.8).

The brush that is produced as a one-piece plastic injection molded part in this way is shown in FIG. 2. The drawing shows the ends where the distal end and proximal end of the slider were previously situated. These ends are labeled with the letters D and P in FIG. 2. The longitudinal axis L of the brush corresponds to the longitudinal axis L of the main cavity from which it was produced.

Figure 3:
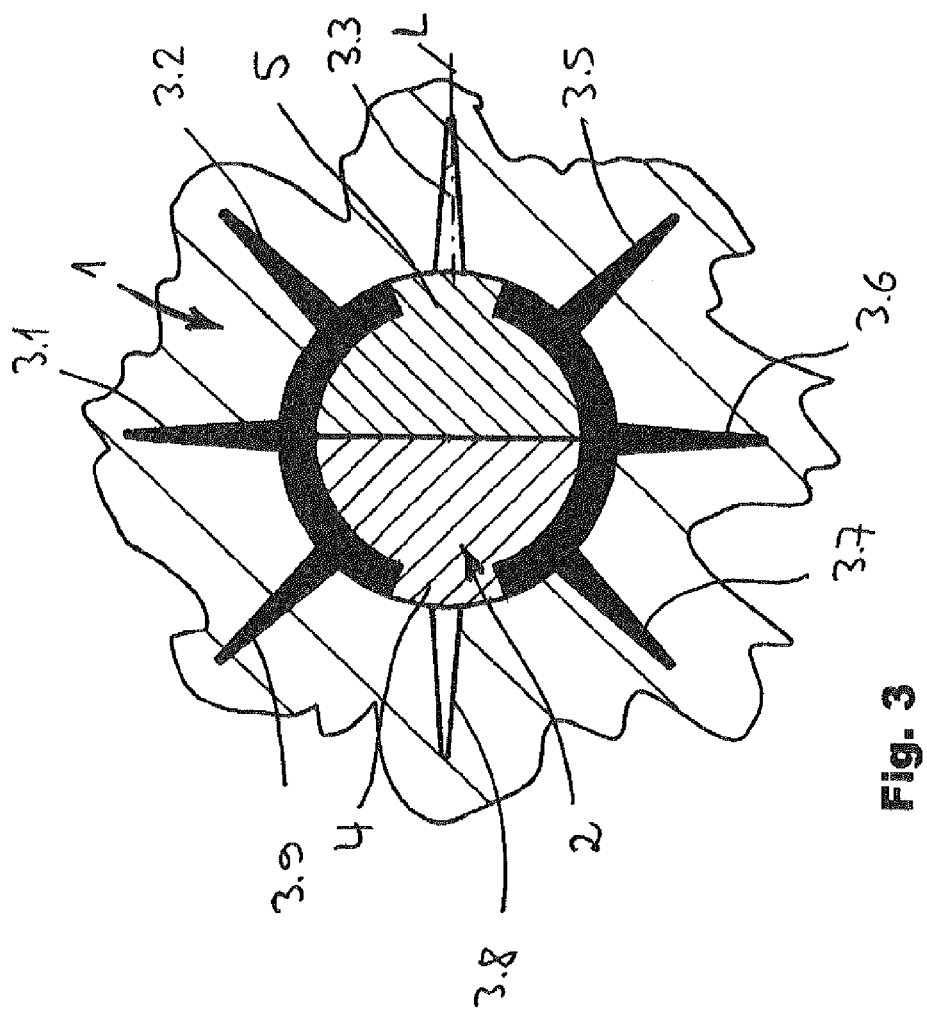
FIG. 3 shows a section through an injection mold constituting a second exemplary embodiment, perpendicular to the longitudinal axis of the main cavity and slider.

FIG. 3 shows another exemplary embodiment of the invention.

With regard to the injection mold, the statements made above in conjunction with FIG. 1 apply here as well.

In this case, two sliders 4 and 5 are inserted into the main cavity 2 of this injection mold and initially occupy most of the main cavity. Each of the two sliders has a ridge-like projection that seals one row of secondary cavities arranged one after another in the longitudinal direction L so that at first, injection molding compound cannot penetrate into these secondary cavities.

In this case, the two sliders rest against and support each other in the region of the middle of the main cavity while they rest with their ridge-like projections against the inner surface of the main cavity in such a way that the sliders cannot—or essentially cannot—move in the radial direction under the influence of the injection pressure. In this way, the two sliders are centered in the main cavity, i.e. they always assume the desired setpoint position in the main cavity.

In a first step, a first injection molding compound is injected into the two regions of the main cavity not blocked by the sliders and from there, travels into the secondary cavities that are not blocked, see the regions depicted in black in FIG. 3.

The remainder of the injection process occurs in accordance with the explanations given above in conjunction with FIG. 1. The two sliders 4 and 5 can either be withdrawn in tandem so that in a second step, the space previously occupied by them and the secondary cavities 3.3 and 3.8 previously sealed by them can be filled with a second injection molding compound. Alternatively, it is naturally also possible to withdraw the two sliders 4 and 5 one after another so that in the end, the brush is composed of three different plastics. The key point here is that even if only one slider is withdrawn at first, the remaining slider does not become unstable during the following injection procedure even though it protrudes into the main cavity in the form of a cantilever element clamped at one end. This is because the remaining slider and the main cavity are embodied so that the plastic compound that was injected with the first injection and has already solidified supports the remaining slider and ideally, contributes to centering the slider.

The brush produced in this way is shown in FIG. 4.

For the case in which only two different plastic compounds are to be used, the two sliders 4 and 5 "merge" to create a single slider without losing the particularly advantageous centering function described above.

Figure 5:
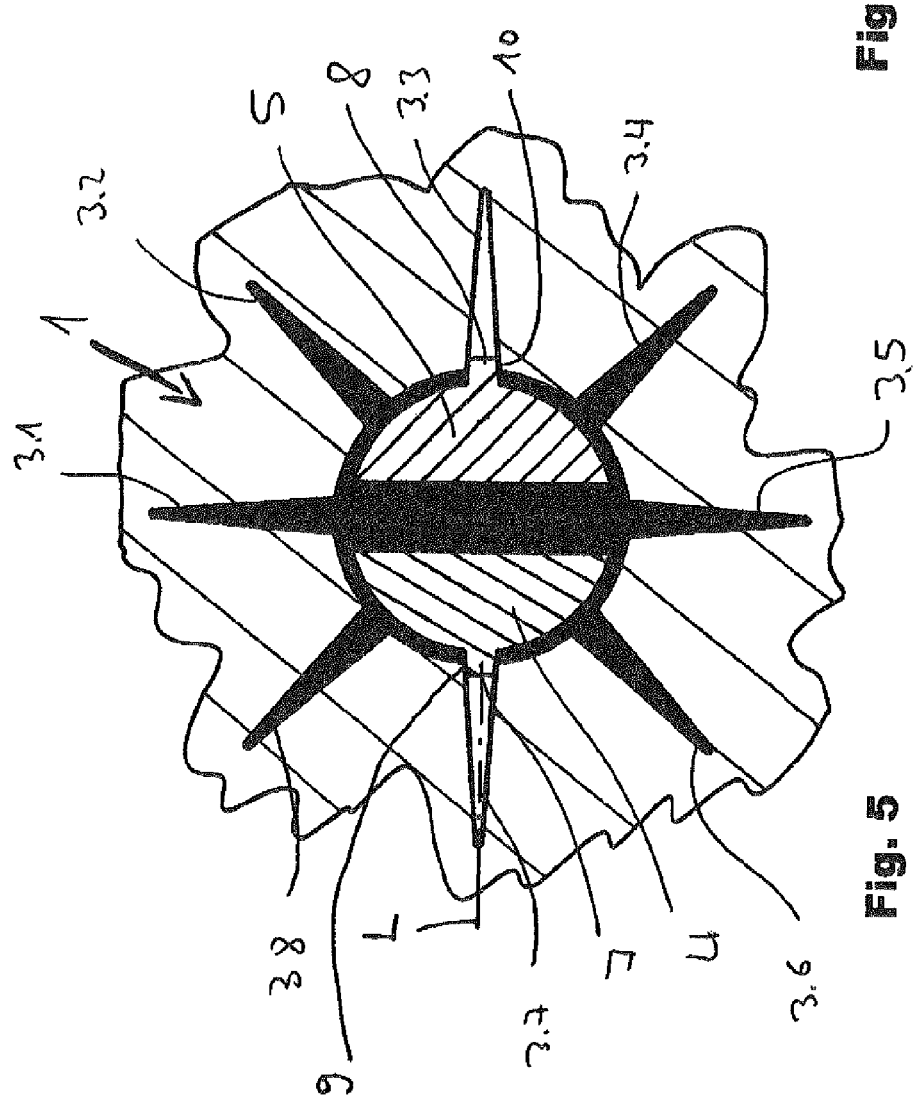
FIG. 5 shows a section through an injection mold constituting a third exemplary embodiment, perpendicular to the longitudinal axis of the main cavity and slider.

FIG. 5 shows another exemplary embodiment of the invention.

Statements made above in connection with the description of FIG. 1 regarding the injection mold, the sliders, and the manner in which the procedure is carried out apply here as well, provided that nothing to the contrary is stated below.

There are two aspects that differ from the foregoing description:

The two sliders 4 and 5 in this case do not rest against each other with their rear surfaces oriented away from the inner surface of the injection mold, but instead, leave open an intermediate space in at least some regions between themselves. The first injection molding compound can travel into this intermediate space, which causes the sliders 4 and 5 to be pressed outward in the radial direction, firmly against the inner circumference of the injection mold. This improves the sealing action of the sliders, in other words it truly ensures that no injection molding compound is able to penetrate into the regions where it is not wanted, which are blocked by the sliders as intended.

Each of the sliders is equipped with a respective sealing strip 7 or 8 that engages in a corresponding respective sealing groove 9 or 10. These sealing grooves 9 and 10 are grooves that continuously extend in the longitudinal direction, into whose groove bottom secondary cavities feed, which form a row of bristles situated one behind another in the longitudinal direction L.

Such an embodiment can assist the longitudinal slider in the centering function and can facilitate the sealing of the mouths of the secondary cavities even if the sliders do not overlap the mouths by a wide margin.

Figure 6:
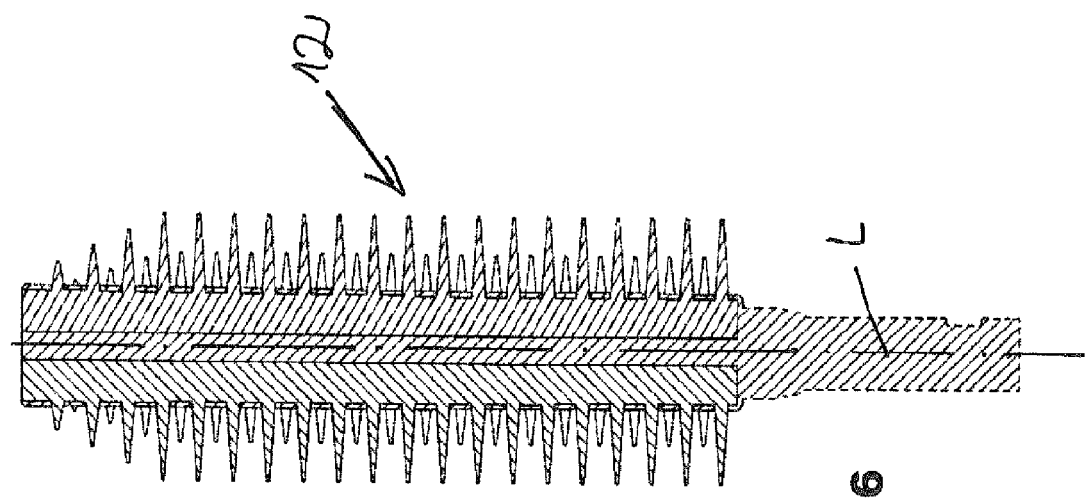
FIG. 6 shows a mascara brush produced using the injection mold according to FIG. 5.

FIG. 6 shows a section through a brush that can be produced using the injection mold shown in FIG. 5 and the associated sliders.

FIG. 7 shows another exemplary embodiment of the invention, but not at a partially injection molded stage, with sliders still inserted in the main cavity, but rather after the injection molding process has been completed. The secondary cavities 3.2, 3.4, 3.6, and 3.8 lie behind the plane of the drawing and are therefore not depicted with crosshatching.

Statements made above in connection with the description of FIG. 1 regarding the injection mold, the sliders, and the manner in which the procedure is carried out apply here as well, provided that nothing to the contrary is stated below.

In this instance, a slider 4 has been inserted as a longitudinal slider into the main cavity from one end. This slider is guided and secured in position inside the main cavity by the grooves 9 and 10 in which it travels as it is inserted. The slider has initially blocked the middle region of the main cavity 2 and sealed the secondary cavities 3.1 and 3.5. As a result, the first injection molding compound, which is depicted with a crosshatching sloping upward toward the left, is injected into only the two side regions of the main cavity and the secondary cavities branching off from them. The drawing shows very clearly how the slider engages in the grooves 9 and 10, which are grooves extending in the longitudinal direction, into whose groove bottoms feed secondary cavities that form a row of protruding bristles arranged one after another in the longitudinal direction L. The sealing gap between the main cavity and the mouth of each secondary cavity that is sealed by this slider is L-shaped.

This produces a sealing gap that does not extend continuously, but rather abruptly changes its direction by an angle of 90° at one point. This produces a kind of labyrinth that ensures a better sealing action.

FIG. 8 shows a fifth exemplary embodiment of the invention.

Statements made above in connection with the description of FIG. 1 regarding the injection mold, the sliders, and the manner in which the procedure is carried out apply here as well, provided that nothing to the contrary is stated below.

The special feature of this exemplary embodiment lies in the fact that a total of three sliders are inserted into the main cavity, namely the middle slider depicted in black and the two sliders adjoining it on both sides depicted with crosshatching sloping upward to the right. These three sliders can be withdrawn one after another so that four different injection molding compounds can be injected one after another.

The slider depicted in black and the slider shown on the left once again include schematic depictions indicating that the slider can, if necessary, be provided with an outward-protruding ridge or an outward-protruding projection that engages in a groove 9, 10 that assists in defining the exact position of the slider and above all, improves the sealing action. This is particularly true for the slider shown on the left because this slider is equipped with a ridge 8 extending in the longitudinal direction L, which engages in the groove 10. To the left and right of the groove, the slider additionally rests against the injection mold's inner surface that defines the main cavity. The sealing gap thus produced changes direction twice by 90° each time, thus forming a kind of labyrinth that produces a particularly reliable seal.

Figure 9:
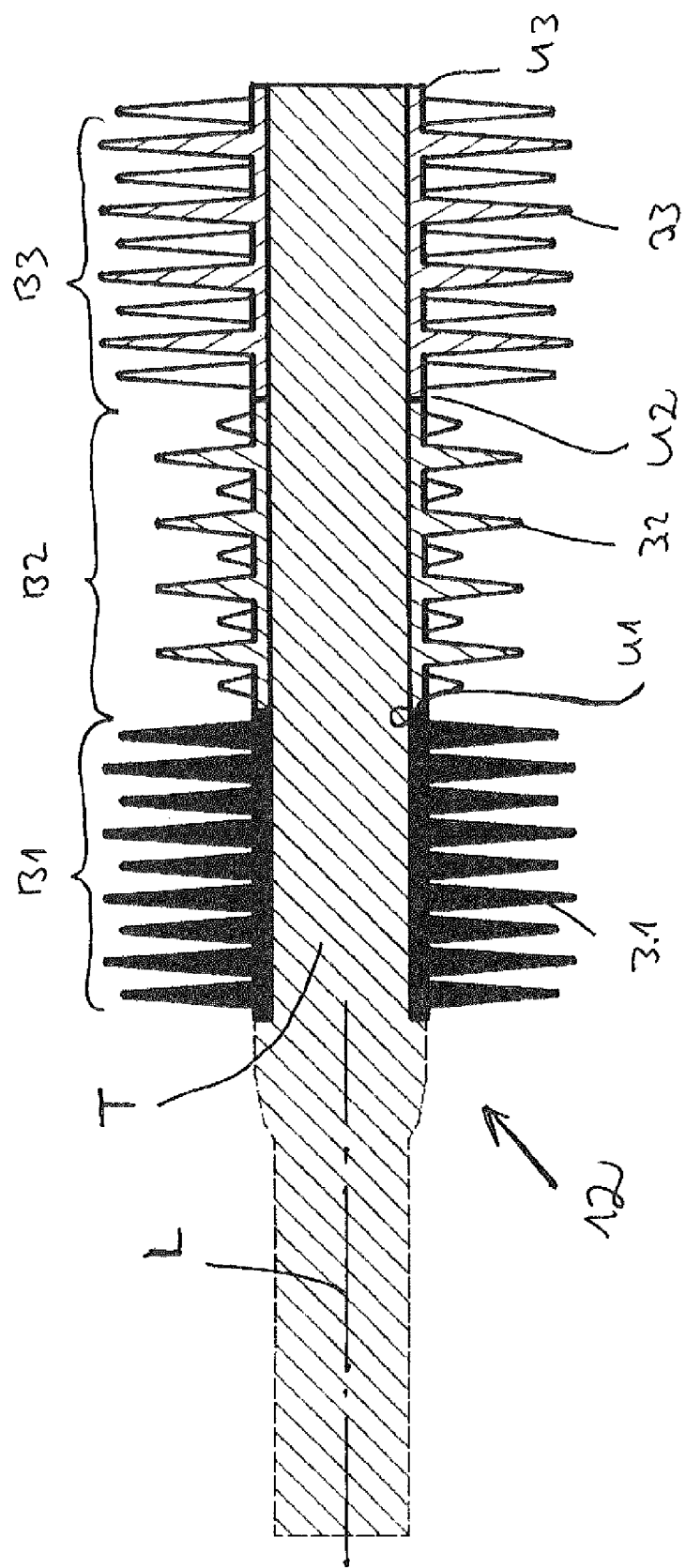
FIG. 9 shows a sixth exemplary embodiment.

FIG. 9 shows a brush that constitutes a sixth exemplary embodiment of the invention.

The brush 12 is composed of a support T that is pre-formed and then inserted into an injection mold. Inside the second injection mold into which it is inserted, the support T comes to rest between the circumferential lines U1 and U3 inside a tubular slider, which in this first step, blocks the regions B2 and B3, i.e. prevents injection molding compound in the region B1 from traveling into regions B2 and B3. Then a first injection molding compound, e.g. an injection molding compound whose material is the softest of all of the materials used for the bristles, is injected into the region shown in black. Naturally, the bristles of type 3.1 are embodied in the same way. Then, the tubular slider is withdrawn partway until its free end surface is even with the circumferential line U2. Then, region B2 between the circumferential lines U1 and U2 is injection molded, simultaneously also producing the bristles of type 3.2. The injection molding material used for this can be the hardest of all of the materials used for the bristles. Finally, the slider is withdrawn in the direction of the longitudinal axis L until it reaches the circumferential line U3, whereupon the region B3 between the circumferential lines U2 and U3 can be injection molded, simultaneously forming the bristles of type 3.3. The injection molding material used for this can be a material whose hardness corresponds to the hardness of the material used for the first region depicted in black or whose hardness is between the hardness of the hardest material and that of the softest material. Then, the completed brush is removed from the mold.

Instead of a pre-formed support T, it is also possible to produce the support in situ by first inserting the slider all the way in so that it blocks the regions B1, B2, and B3 completely while the plastic compound that forms the support is injected in a first step. Then the process continues as explained above.

Figure 10:
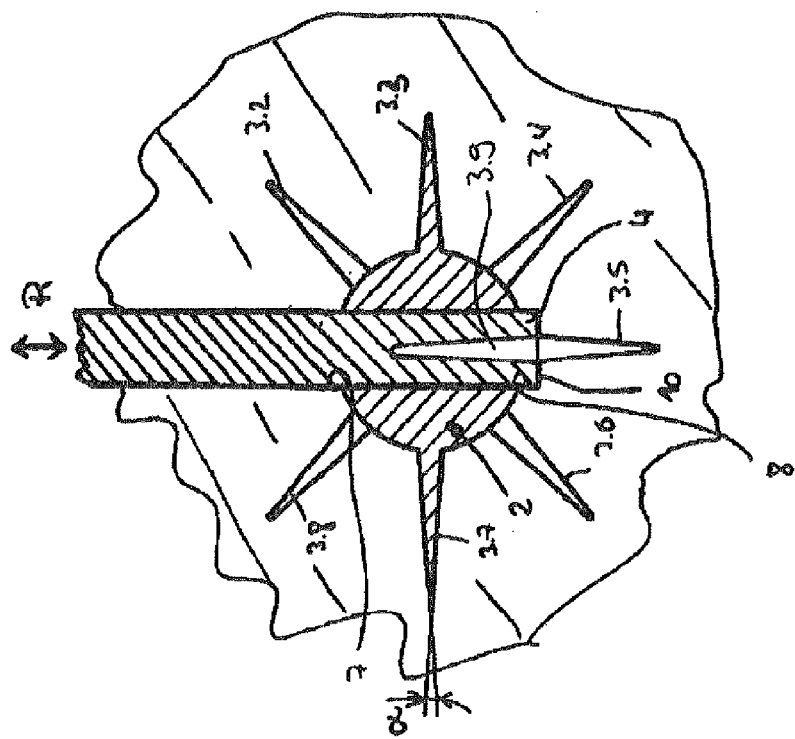
FIG. 10 shows an exemplary embodiment in which a radial slider instead of a longitudinal slider is used to produce the applicator shown in FIG. 7.

FIG. 10 shows a seventh exemplary embodiment of the invention.

In this instance, the injection mold as such is embodied in basically the same way as the injection mold shown in FIG. 1. The essential difference is that at least one of the segments embodied in the form of a slice of cake is provided with a through opening via which a radial slider 4 can be inserted into the mold cavity in the radial direction and withdrawn from the mold again, see the arrow R in FIG. 10.

In the course of being inserted, the radial slider 4 crosses through the main cavity and is finally inserted into a groove or sealing groove 10 on the opposite side of the main cavity (in terms of the insertion direction). One or more secondary cavities 3.5 arranged in a row in the longitudinal direction open out into the bottom of this groove. As is clear from the drawing, the mouths of these cavities are covered by the radial slider and are therefore not filled with the injection molding compound or compounds that has/have been injected into the regions of the main cavity that have remained open to the left and right of the radial slider according to FIG. 10.

It is not difficult to understand that the position of the slider 4 inside the main cavity is stabilized by its engagement in the groove 10.

The particular sealing action that is produced by the engagement of the radial slider 4 in the sealing groove 10 is the same as that described in connection with FIG. 7. Statements made there apply here as well.

Figure 13:
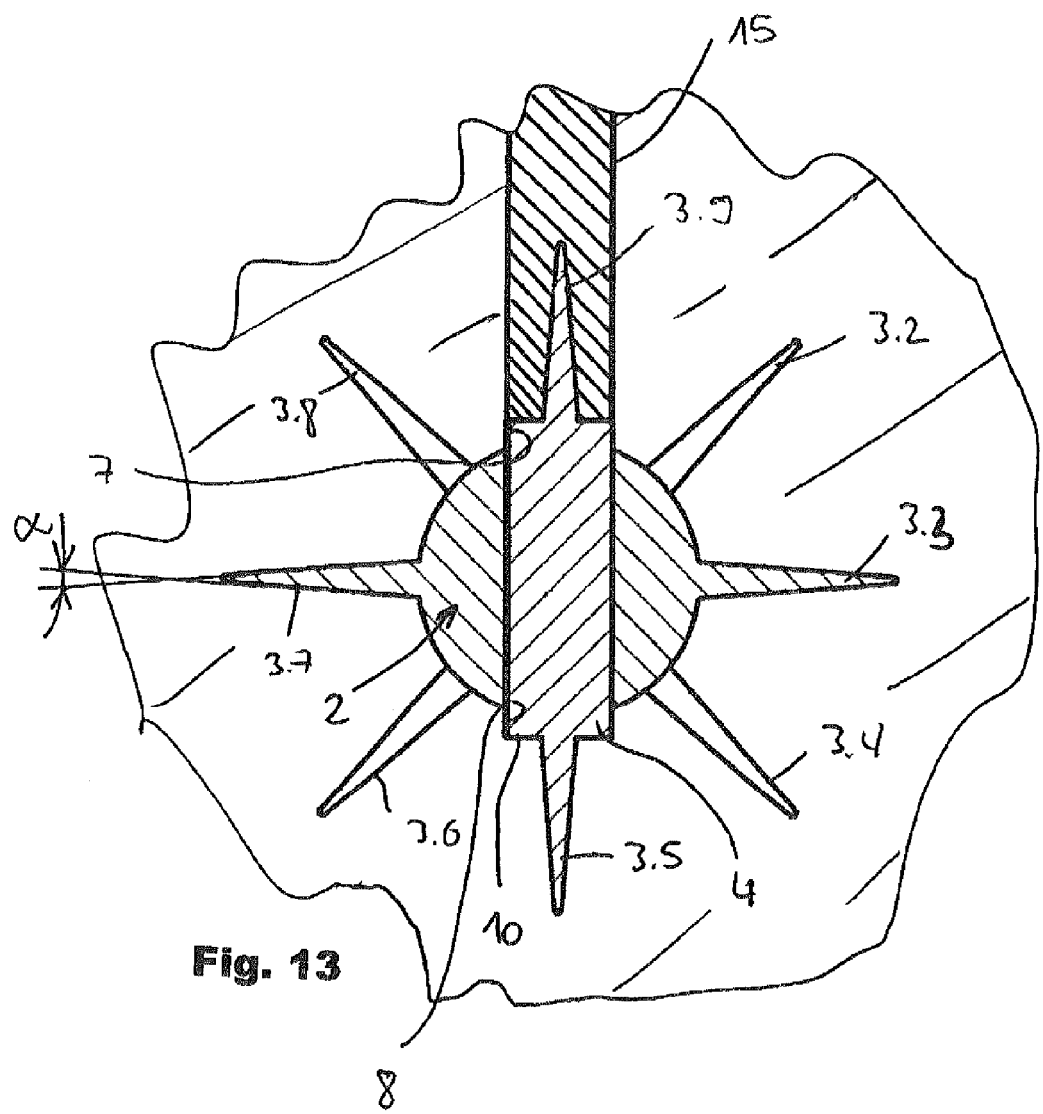
FIG. 13 shows the exemplary embodiment according to FIG. 10 with the radial slider retracted and after the injection of the second injection molding compound.

After the injection molding compound that has been injected into the regions remaining open to the left and right of the radial slider 4 has solidified (see FIG. 10), the radial slider 4 is completely withdrawn and replaced by a replacement radial slider 15, which is in turn equipped with secondary cavities and is (only) inserted as far as is shown in FIG. 13.

The brush can then be injection molded using a second injection molding procedure. FIG. 13 shows this in the completed state.

In an improved embodiment, the original radial slider 4 is already equipped with one or more secondary cavities 3.9 for forming the bristles, as already shown in FIG. 10. It therefore only has to be withdrawn a certain distance in order to produce an arrangement that corresponds to the one shown in FIG. 13 and permits the injection molding of the brush to be completed.

Figure 11:
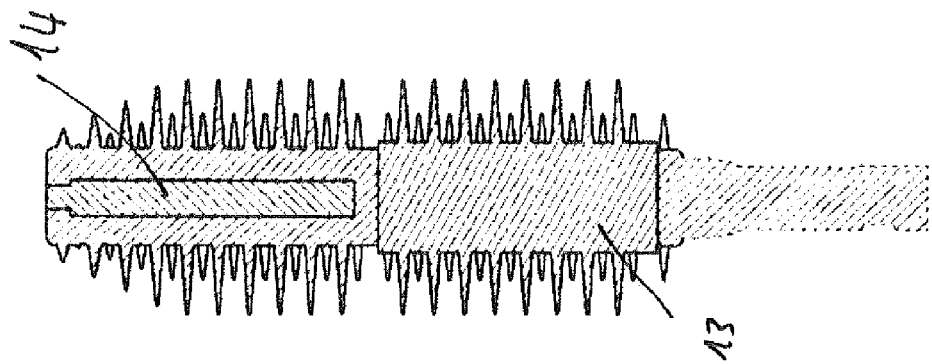
FIG. 11 shows a side view of the mascara brush produced using the injection mold according to FIG. 10.
Figure 12:
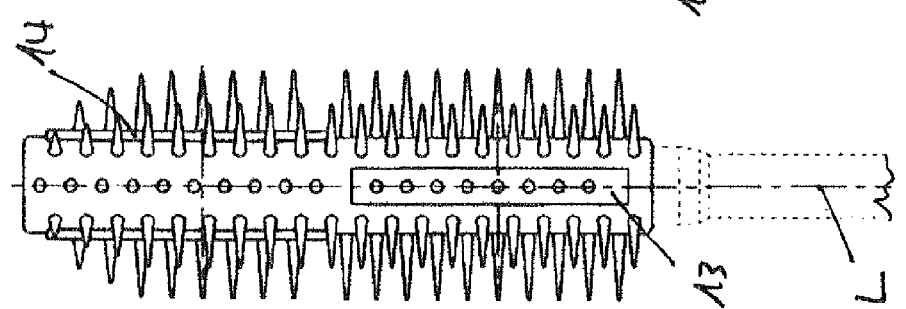
FIG. 12 shows a longitudinal section through the mascara brush shown in FIG. 10.

The exemplary embodiment explained above in conjunction with FIG. 10, which preferably operates with a radial slider 4, can easily be modified so that it is possible to injection mold a mascara applicator of the kind shown in FIGS. 11 and 12.

In order to produce such a mascara applicator, the injection mold according to FIG. 10 is modified so that two sliders situated one behind the other in the longitudinal direction 4 are used. Preferably, the two sliders are situated offset from each other by 90° (with regard to their insertion direction).

Each individual slider is preferably embodied as explained in conjunction with FIGS. 10 and 13. The first slider initially keeps a cavity open, which forms the first plastic region 13 after injection. The second slider initially keeps a cavity open, which forms the second plastic region 14 after injection, see FIGS. 11 and 12.

Figure 14:
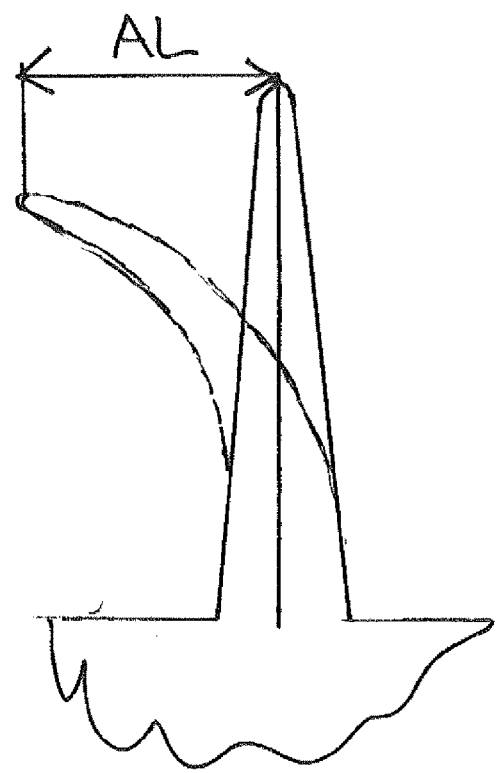
FIG. 14 illustrates the definition of the term bristle.

It should be clarified that in the context of the invention, a bristle is preferably understood to mean only such a rod-shaped structure whose cross-section is essentially smaller than its length such that the freely extending tip of the structure can be deflected by at least five times the amount (AL) and better still, ten times the amount (AL) of the maximum diameter of the structure without permanently deforming the structure, see FIG. 14.

The diameter or average diameter of the structure, which in the context of the present invention is referred as a bristle, is preferably between 0.15 mm and 1 mm, ideally between 0.15 mm and 0.6 mm.

The diameter at the outer circumference of the bristle field is preferably between 4 mm and 8 mm.

The invention claimed is:

1. A method for producing a brush, particularly in the form of a mascara applicator, with bristles injection molded out of different injection molding compounds, comprising:
   using an injection mold that has a main cavity, which forms a bristle support, and the main cavity has at least one groove that extends in a longitudinal direction parallel to a longitudinal axis of the main cavity; and a plurality of secondary cavities branching off from the main cavity, with each of the plurality of secondary cavities forming a single bristle;
   inserting at least one slider into the main cavity, wherein the at least one slider closes a first set of the plurality of secondary cavities so that a first injection molding compound only travels into a second set of the plurality of secondary cavities, and the at least one slider has a sealing strip protruding outward beyond a circumferential surface of the at least one slider and extending in a direction parallel to the longitudinal axis, which, when the at least one slider is inserted into the injection mold, radially engages into the at least one groove such that the first set of the plurality of secondary cavities in the at least one groove is sealed by the sealing strip;
   injecting the first injection molding compound into the main cavity;
   after the first injection molding compound travels into the second set of the plurality of secondary cavities, withdrawing the at least one slider; and
   injecting a second injection molding compound so that the second injection molding compound travels into the first set of the plurality of secondary cavities previously closed by the at least one slider, and in the finished applicator forms a row of protruding bristles situated one after another in the longitudinal direction.

2. The method for producing a brush, particularly embodied in the form of a mascara applicator, according to claim 1, wherein the at least one slider and the injection mold are embodied so that the at least one slider can be withdrawn from the main cavity in a direction essentially or completely parallel to the longitudinal axis of the mascara applicator.

3. The method for producing a brush, particularly embodied in the form of a mascara applicator, according to claim 1, wherein the sealing strip rests in a sealing fashion in the at least one groove and also next to the at least one groove on at least one side.

4. The method for producing a brush, particularly embodied in the form of a mascara applicator, according to claim 1, wherein the at least one slider is composed of multiple parts.

5. The method for producing a brush, particularly embodied in the form of a mascara applicator, according to claim 1, wherein the at least one slider is a radial slider that is inserted into the main cavity in a radial direction.

6. An apparatus for producing a brush, particularly embodied in the form of a mascara applicator, using a method comprising:
   using an injection mold that has a main cavity, which forms a bristle support, and the main cavity has at least one groove that extends in a longitudinal direction parallel to a longitudinal axis of the main cavity; and a plurality of secondary cavities branching off from the main cavity, with each of the plurality of secondary cavities forming a single bristle;
   inserting at least one slider into the main cavity, wherein the at least one slider closes a first set of the plurality of secondary cavities so that a first injection molding compound only travels into a second set of the plurality of secondary cavities, and the at least one slider has a sealing strip protruding outward beyond a circumferential surface of the at least one slider and extending in a direction parallel to the longitudinal axis, which, when the at least one slider is inserted into the injection mold, radially engages into the at least one groove such that the first set of the plurality of secondary cavities in the at least one groove is sealed by the sealing strip;
   injecting the first injection molding compound into the main cavity;
   after the first injection molding compound travels into the second set of the plurality of secondary cavities, withdrawing the at least one slider; and
   injecting a second injection molding compound so that the second injection molding compound travels into the first set of the plurality of secondary cavities previously closed by the at least one slider, and in the finished applicator forms a row of protruding bristles situated one after another in the longitudinal direction.

* * * * *